United States Patent Office 2,751,418
Patented June 19, 1956

2,751,418

CATALYTIC OXIDATION OF HYDROCARBONS TO HYDROPEROXIDES

Herman I. Enos, Jr., Wilmington, Del., assignor to Hercules Powder Company, Wilmington, Del., a corporation of Delaware No Drawing. Application July 10, 1953, Serial No. 367,367

11 Claims. (Cl. 260—610)

This invention relates to improvements in the oxidation of organic compounds by elementary oxygen and more particularly to such oxidation processes as lead to the production of hydroperoxides.

In the oxidation of organic compounds of alkyl-substituted aromatic compounds of the general formula

in which $R_1$ represents an alkyl group, $R_2$ represents an alkyl or aryl group, and Ar represents an aryl group with elementary oxygen for the production of hydroperoxides, there is ordinarily an induction period during which time the rate of oxidation proceeds very slowly. Moreover, there is frequently difficulty in continuing the oxidation at a satisfactory rate after it has once been started. Various types of materials have been suggested for initiating and sustaining the oxidation of such compounds, and some of these materials have been useful in improving the yield of the corresponding hydroperoxides.

Now in accordance with the present invention, it has been found that a still greater improvement, which lies in accelerating the rate of oxidation of alkyl-substituted aromatic organic compounds to hydroperoxides, is accomplished by contacting a compound of the above-designated structural formula with elementary oxygen in the presence of 1 to 100 times the minimum effective amount of a finely divided noble metal catalyst.

The improved process of this invention is generally carried out by dispersing a finely divided noble metal such as palladium or platinum in the alkyl-substituted aromatic organic compound of the above-designated structural formula and passing a finely dispersed stream of air or oxygen through the reaction mixture at a temperature in the range of about 40° C. to about 125° C. until the hydroperoxide content of the mixture reaches the desired amount. The catalyst is then filtered out and the hydroperoxide is recovered from the reaction mixture or the reaction mixture is used directly for further reactions. To aid in the oxidation, an alkali such as ammonia, sodium hydroxide, sodium carbonate, sodium bicarbonate or lime is brought into contact with the reaction mixture during the oxidation process.

Specific illustrations of the process of this invention are set forth in the following examples. All parts and percentages, unless stated otherwise, are on a weight basis.

Examples 1–5

A mixture of 300 parts p-cymene, containing 3.0 parts cymene hydroperoxide as an initiator and 300 parts water containing 1.2 parts sodium bicarbonate was stirred vigorously at 90° C. while a fine stream of oxygen was introduced into the reaction mixture. The rate of hydroperoxide formation was followed for about 20 hours to find the initial rate and then a finely divided noble metal catalyst was added and the rate of hydroperoxide formation was again followed to find the rate in the presence of the catalyst. In the following table are set forth data on several runs using various noble metal catalysts. The rate of hydroperoxide formation is expressed in per cent increase in hydroperoxide content of the reaction mixture per hour.

| Example | 1 | 2 | 3 | 4 | 5 |
|---|---|---|---|---|---|
| Initial Rate of Hydroperoxide Formation (percent/hour) | 0.6 | 0.6 | 0.6 | | |
| Catalyst | Pd | Pt | Pd | Pd | Pd |
| Parts Catalyst per Million of p-Cymene | 25 | 25 | 8.5 | 16 | 50 |
| Hydroperoxide Content (percent) at Time of Adding Catalyst | 13.4 | 13.6 | 11.5 | 1.0 | 1.0 |
| Catalyzed Rate of Hydroperoxide Formation (percent/hour) | 2.5 | 1.4 | 0.9 | 0.9 | 3.3 |
| Hydroperoxide Yield (Mol percent) at End of Run | 56 | 77 | | 80 | 76.5 |
| Percent p-Cymene Consumed at End of Run | 36.4 | 19.0 | 16.0 | 28.5 | 17.0 |

Example 6

A mixture of 300 parts p-cymene, 12 parts p-cymene hydroperoxide, 300 parts water containing dissolved therein 6 parts sodium salt of dehydrogenated rosin and 6 parts sodium bicarbonate and 0.2 part finely divided palladium per million parts p-cymene was heated to 90° C. with rapid agitation and a fine stream of oxygen was passed into the reaction mixture for 7.3 hours. The p-cymene hydroperoxide content increased from 4% to 36.4% in this length of time, showing an average rate of increase in hydroperoxide content of 4.4% per hour. This corresponded to a yield of 67 mol. per cent at 46.5% p-cymene reacted. In a blank run without the palladium, 11.8 hours were required to attain a hydroperoxide content of 36%.

Example 7

A mixture of 125 parts sec-butylbenzene and 1.7 parts sec-butylbenzene hydroperoxide was stirred vigorously with 12.5 parts water containing 0.11 part sodium carbonate dissolved therein, and 0.00625 part colloidal palladium, dispersed in 12.5 parts water, was added. This rapidly stirred mixture was heated to 115° C. and oxygen was introduced under 80 p. s. i. g. pressure. The rate of hydroperoxide formation over 14.2 hours was 2.1% per hour, and at the end of 6.5 hours the mixture contained 13.6% sec-butylbenzene hydroperoxide. In a blank run, in which the palladium catalyst was left out but 12.5 parts water free of catalyst was used instead, the rate of oxidation was such that 14.2 hours were required to reach a hydroperoxide content of 13.4%. This corresponded to a blank rate of 0.95% hydroperoxide per hour.

Comparative tests with and without platinum and palladium catalysts in the oxidation of cumene, β-isopropylnaphthalene, cymene, and diisopropylbenzene show that there is a substantial increase in the rate of hydroperoxide formation when these noble metal catalysts are used in the oxidation process in accordance with the process of this invention.

The improvement in rate of oxidation is shown with all of the noble metal catalysts—palladium, platinum, osmium, iridium, ruthenium, and rhodium. The noble metal catalyst must be used in finely divided form and must be catalytically active. If the catalyst is catalytically active toward hydrogenation reactions, it is catalytically active in the process of this invention. By "finely divided" is meant that it is sufficiently finely divided as to have high enough surface to be classed as a catalyst. The finely divided catalyst may be attached to a support such as a noble metal, carbon, alumina, etc., and the amount of catalyst does not include the amount of any such support. The catalyst is also useful in colloidal form. The amount of noble metal catalyst is critical in that an excess causes increased by-product formation. In general, the catalyst concentration range is from about 0.01 to about 1000 parts per million of the hydrocarbon being oxidized depending on the activity of the catalyst. The lower end of the range generally is used for the most finely divided catalyst or most active catalyst and the upper end of the range is generally used for the less finely divided catalyst or less active catalyst. The amount of catalyst to use is not more than 100 times the minimum effective amount. Thus, the range is essentially from a minimum effective amount to about 100 times the minimum effective amount, the minimum effective amount being defined as that amount which increases the rate of hydroperoxide formation by 10%. The minimum effective amount must be determined for each batch of catalyst used, since it varies with method of preparation and particle size of the catalyst.

The oxidation process of this invention is carried out at any temperature in the range of about 40° C. to about 125° C. The optimum range is about 80°–125° C. and the preferred range is 85°–120° C.

The process is carried out either in the absence of water or in the presence of water, and it may be carried out in aqueous emulsion of the oil-in-water or the water-in-oil type, if desired. Emulsifying agents such as soaps of fatty or resin acids, alkyl and alkaryl sulfates and sulfonates, and other ionic and nonionic emulsifiers may be used when the process is carried out in emulsified systems.

The oxidation is preferably carried out in the presence of an alkaline stabilizing agent. Alkalies may be added to the reaction mixture or the reaction mixture may be continuously circulated into a vessel containing alkali. Alkalies which are suitable are ammonia; sodium and potassium compounds such as their hydroxides, carbonates, or bicarbonates, and alkaline-acting salts such as the acetate, stearate, and resinate; lime; magnesia; and calcium carbonate. The alkali metal compounds are best used in aqueous systems and the calcium and magnesium compounds are best in nonaqueous systems.

The hydrocarbons to which the process of this invention is applied for the production of hydroperoxides have the formula

in which $R_1$ represents alkyl groups, $R_2$ represents alkyl and aryl groups, and Ar represents an aryl group. Alkyl groups include aralkyl groups and aryl groups include alkaryl groups. Examples of $R_1$ and $R_2$ are: methyl, ethyl, propyl, butyl, benzyl and phenylethyl, and within the above expressed limits $R_1$ and $R_2$ may be the same or different. Examples of Ar are phenyl, tolyl, biphenyl, naphthyl, phenanthryl, and aromatic groups bearing lower alkyl substituents on the aromatic ring, and other linear and condensed polynuclear aryl groups. Ar thus includes hydrocarbon-substituted aryl groups.

The oxygen used in the oxidation process is elementary oxygen. Molecular oxygen such as pure oxygen gas or oxygen diluted with inert gases such as air may be used. Oxygen diluted with other gases including steam, or other inert gases, may also be used.

There are many advantages in the process of this invention other than those due to the increased rate of oxidation. For example, in the oxidation of cymene, use of the noble metal catalysts of this invention results in the final product containing very little primary hydroperoxide. The major portion of the product is composed of the tertiary hydroperoxide. A further advantage of the noble metal catalysts is their ease of removal. They may be removed by filtration, a filter aid being used if desired and further treatment of the oxidate is unnecessary before distillation or any other desired subsequent treatment.

What I claim and desire to protect by Letters Patent is:

1. The process of preparing a tertiary hydroperoxide which comprises passing elementary oxygen through an alkyl-substituted aromatic organic compound having the structural formula

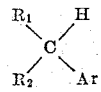

in liquid phase at a temperature between about 40° C. and about 125° C. in the presence of a finely divided metal of atomic number in the range of 44–78, and classified in group VIII of the periodic table, as a catalyst, the concentration of the finely divided metal catalyst in the oxidation reaction mixture being from 1 to 100 times the amount based on the alkyl-substituted aromatic compound which increases the rate of hydroperoxide production by 10%, and in the structural formula $R_1$ representing alkyl groups, $R_2$ representing aryl and alkyl groups, and Ar representing an aryl group.

2. The process of claim 1 in which the metal is platinum.

3. The process of claim 1 in which the metal is palladium.

4. The process of preparing a tertiary hydroperoxide which comprises passing elementary oxygen through an alkyl-substituted aromatic organic compound having the structural formula

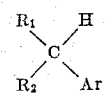

in aqueous emulsion at a temperature between about 40° C. and about 125° C. in the presence of a finely divided metal of atomic number in the range of 44–78, and classified in group VIII of the periodic table, as a catalyst, the concentration of the finely divided metal catalyst in the oxidation reaction mixture being from 1 to 100 times the amount based on the alkyl-substituted aromatic compound which increases the rate of hydroperoxide production by 10%, and in the structural formula $R_1$ representing alkyl groups, $R_2$ representing aryl and alkyl groups, and Ar representing an aryl group.

5. The process of preparing a tertiary hydroperoxide which comprises passing elementary oxygen through an alkyl-substituted aromatic organic compound having the structural formula

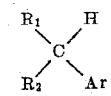

in liquid phase at a temperature between about 80° C. and 125° C. in the presence of a finely divided metal of atomic number in the range of 44–78, and classified in group VIII of the periodic table, as a catalyst, the concentration of the finely divided metal catalyst in the oxidation reaction mixture being from about 1 to 100 times the amount based on the alkyl-substituted aromatic compound which increases the rate of hydroperoxide production by 10%, and in the structural formula $R_1$ representing aralkyl groups, $R_2$ representing aryl and alkyl groups, and Ar representing an aryl group.

6. The process of preparing a tertiary hydroperoxide which comprises passing elementary oxygen through an alkyl-substituted aromatic organic compound having the structural formula

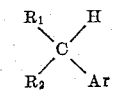

in liquid phase at a temperature between about 85° C. and about 120° C. in the presence of a finely divided metal of atomic number in the range of 44–78, and classified in group VIII of the periodic table, as a catalyst, the concentration of the finely divided metal catalyst in the oxidation reaction mixture being from about 1 to 100 times the amount based on the alkyl-substituted aromatic compound which increases the rate of hydroperoxide production by 10%, and in the structural formula $R_1$ representing alkyl groups, $R_2$ representing aryl and alkyl groups, and Ar representing an aryl group.

7. The process of claim 6 in which the alkyl-substituted aromatic organic compound is cymene.

8. The process of claim 6 in which the alkyl-substituted aromatic organic compound is cumene.

9. The process of claim 6 in which the alkyl-substituted aromatic organic compound is β-isopropylnaphthalene.

10. The process of claim 6 in which the alkyl-substituted aromatic organic compound is sec-butylbenzene.

11. The process of claim 6 in which the alkyl-substituted aromatic organic compound is diisopropylbenzene.

References Cited in the file of this patent

UNITED STATES PATENTS

| | | |
|---|---|---|
| 2,475,155 | Rosenblatt | July 5, 1949 |
| 2,664,448 | Lorand et al. | Dec. 29, 1953 |